United States Patent
Hopkins, III

(10) Patent No.: US 7,835,994 B1
(45) Date of Patent: Nov. 16, 2010

(54) SYSTEMS AND METHODS FOR PERFORMING FLOW-THROUGH BANKING

(75) Inventor: John C. Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/273,019

(22) Filed: Nov. 18, 2008

(51) Int. Cl.
*G06Q 20/00* (2006.01)

(52) U.S. Cl. .............................. 705/67; 705/64; 705/39; 705/40

(58) Field of Classification Search .................. 705/67, 705/64, 39, 40
See application file for complete search history.

(56) References Cited

U.S. PATENT DOCUMENTS

| | | | |
|---|---|---|---|
| 6,304,915 B1 | 10/2001 | Nguyen et al. | |
| 7,113,925 B2 | 9/2006 | Waserstein et al. | |
| 7,330,835 B2 | 2/2008 | Deggendorf | |
| 7,386,511 B2 | 6/2008 | Buchanan et al. | |
| 2003/0217005 A1* | 11/2003 | Drummond et al. | 705/43 |
| 2004/0133516 A1 | 7/2004 | Buchanan et al. | |
| 2004/0153400 A1* | 8/2004 | Burke | 705/39 |
| 2004/0172368 A1* | 9/2004 | Johnson | 705/64 |
| 2007/0185800 A1* | 8/2007 | Harrison et al. | 705/36 T |
| 2008/0265025 A1* | 10/2008 | Kellogg et al. | 235/382 |
| 2009/0089193 A1* | 4/2009 | Paintin | 705/34 |
| 2009/0218394 A1* | 9/2009 | Drummond et al. | 235/379 |

OTHER PUBLICATIONS

DeYoung, Robert: "Safety, Soundness, and the Evolution of the U.S. Banking Industry", Federal Reserve Bank of Atlanta, Economic Review First and Second Quarters 2007, pp. 41-66.

* cited by examiner

*Primary Examiner*—Pierre E Elisca
(74) *Attorney, Agent, or Firm*—Brooks, Cameron & Huebsch, PLLC

(57) ABSTRACT

A flow-through transaction is effectuated with regard to a deposit account at a financial institution by an intermediary between a customer and the financial institution. The customer is received at a site of the intermediary and a type of the flow-through transaction is determined therefrom. An identification of the financial institution, the account thereat, and an amount of funds involved are received, and a request to a clearinghouse is initiated for the transaction. The clearinghouse establishes that the request is satisfactory and returns an approval of same to guarantee that the transaction is to be performed. A confirmation is provided to the customer upon receiving the approval. Thus, the customer need not visit a site of the financial institution to perform thereat a transaction equivalent to the flow-through transaction.

21 Claims, 4 Drawing Sheets

SYSTEMS AND METHODS FOR PERFORMING FLOW-THROUGH BANKING

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 12/273,025; and
U.S. patent application Ser. No. 12/273,029.

FIELD

The present disclosure is directed to allowing a customer of a bank or other financial institution to perform transactions therewith by way of a third-party. In particular, the present disclosure relates to such transactions that flow through the third-party between the customer and the bank or other financial institution.

BACKGROUND

A bank or other financial institution (hereinafter, 'bank') typically has customers that maintain accounts with such bank for the purpose of performing financial transactions including deposits, withdrawals, and the like. For example, a customer of the bank may have a checking account and a savings account with the bank, and may from time to time deposit a check or cash in the savings account, withdraw cash from the checking account, obtain a certified check based on funds in the savings account, etc.

As may be appreciated, the customer may remotely perform many transactions with the bank in connection with the accounts of such customer. For example, and is generally known, the customer may employ a telephone connection or computing connection with the bank in a generally automated manner to inquire regarding an account balance, transfer funds between accounts, direct that the bank pay an amount of funds to a particular recipient, and the like. Nevertheless, the customer may at times prefer to transact business with the bank in person at a branch office or other site of the bank (hereinafter, 'in person'), or may be required to transact business with the bank in person. For example, the customer if withdrawing cash from an account thereof at the bank may at times be required to do so in person at such bank. Likewise, the customer if depositing instruments such as checks may at times also be required to do so in person at such bank.

It is to be appreciated that many banks now provide automated services that may obviate or at least reduce the need to perform in person transactions such as those set forth above. Most notably, many banks now provide automated teller machines (ATMs) that can perform at least some of the in person transactions on behalf of the bank. Nevertheless, some bank transactions still require that the customer be present at the bank, such as for example obtaining a certified check, or withdrawing a relatively large amount of funds in cash form.

Moreover, at least some customers of the bank prefer to perform banking transactions in person. For example, some of the customers do not like to use ATMs or are not able to use ATMS, while some of the customers do not have access to necessary telephone or computing technology to perform remote transactions with the bank in a generally automated manner.

For the customer of the bank that wishes to perform a transaction with the bank in person, either by choice or by necessity, it is oftentimes a relatively simple matter of the customer traveling to a local branch of the bank and performing the transaction thereat. However, if the customer is not near a local branch of the bank, traveling thereto is of course a more complicated matter. As should be understood, for such a remote customer, traveling to a local branch of the bank may require a long trip by automobile or bus or the like or even a trip by airplane, which in many circumstances requires an inordinate amount of effort that is likely not worthwhile. Moreover, if it happens that the bank wishes to attract such an in person transaction customer who is not near a local branch of such bank, the bank is of course severely limited in being able to do so because of the lack of a local branch for such customer.

Accordingly, a need exists for a method and mechanism by which a customer of a bank may perform an in person transaction with such bank without the need to travel to a local branch of the bank.

SUMMARY

The aforementioned needs are satisfied at least in part by systems and methods performed with regard to a deposit account at a financial institution to effectuate a flow-through transaction for a customer with regard to the account as an intermediary between the customer and financial institution. The customer is received at a site of the intermediary and a type of the flow-through transaction is determined from the received customer. In various embodiments, the type of transaction may be a deposit of funds to the account or a withdrawal of funds from the account, among other things.

An identification of the financial institution, an identification of the account at the financial institution, and an identification of an amount of funds involved are received from the customer, and a request to a clearinghouse is initiated for the type of flow-through transaction in the identified amount with regard to the identified account at the identified financial institution. The clearinghouse receives the request from the intermediary, establishes that the request is satisfactory, and returns an approval of same to guarantee that the requested type of flow-through transaction for the identified amount of funds is to be performed by the clearinghouse with regard to the identified account at the identified financial institution. A confirmation of the flow-through transaction is provided to the customer upon receiving the approval from the clearinghouse. Thus, the customer need not visit a site of the financial institution to perform thereat a transaction equivalent to the flow-through transaction.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
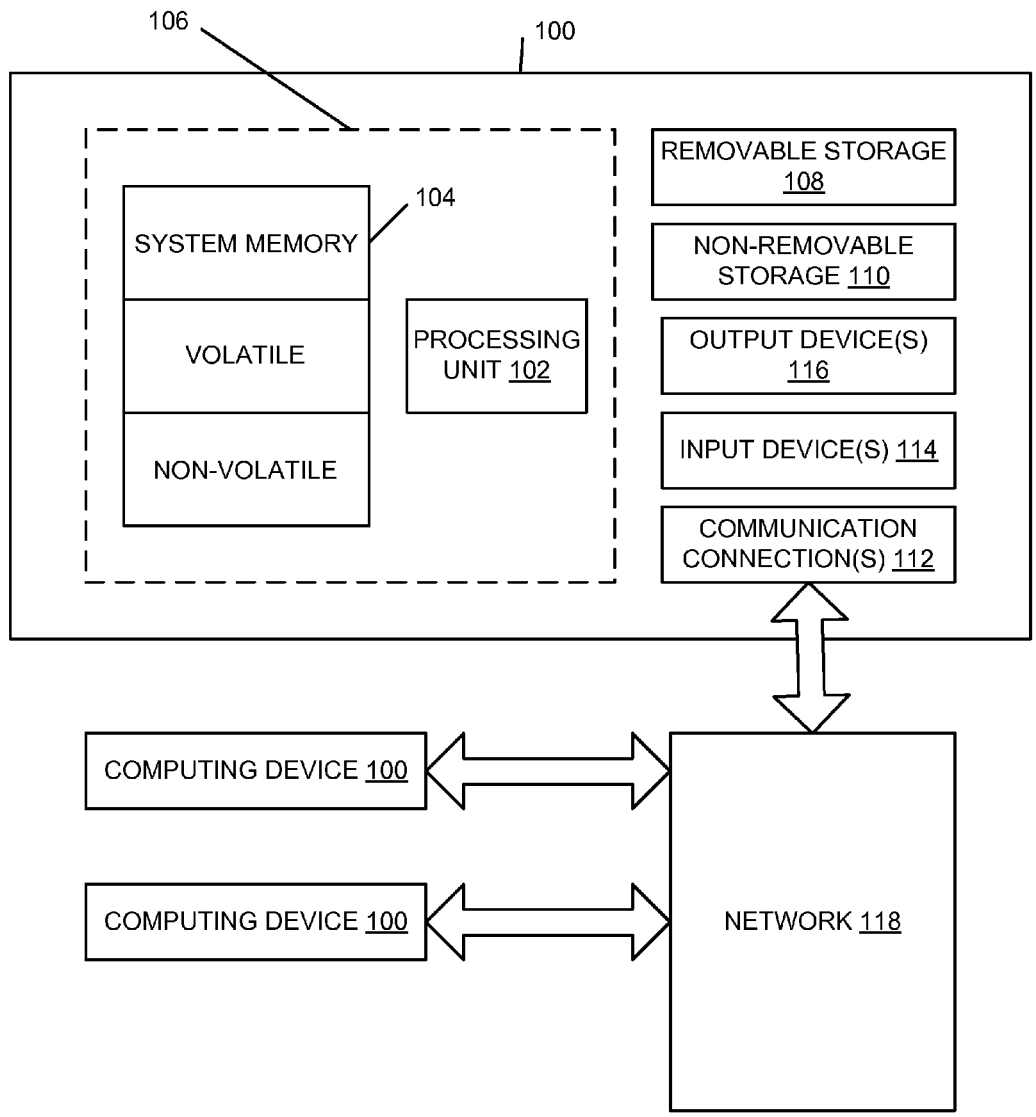
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Flow-Through Banking

Figure 2:
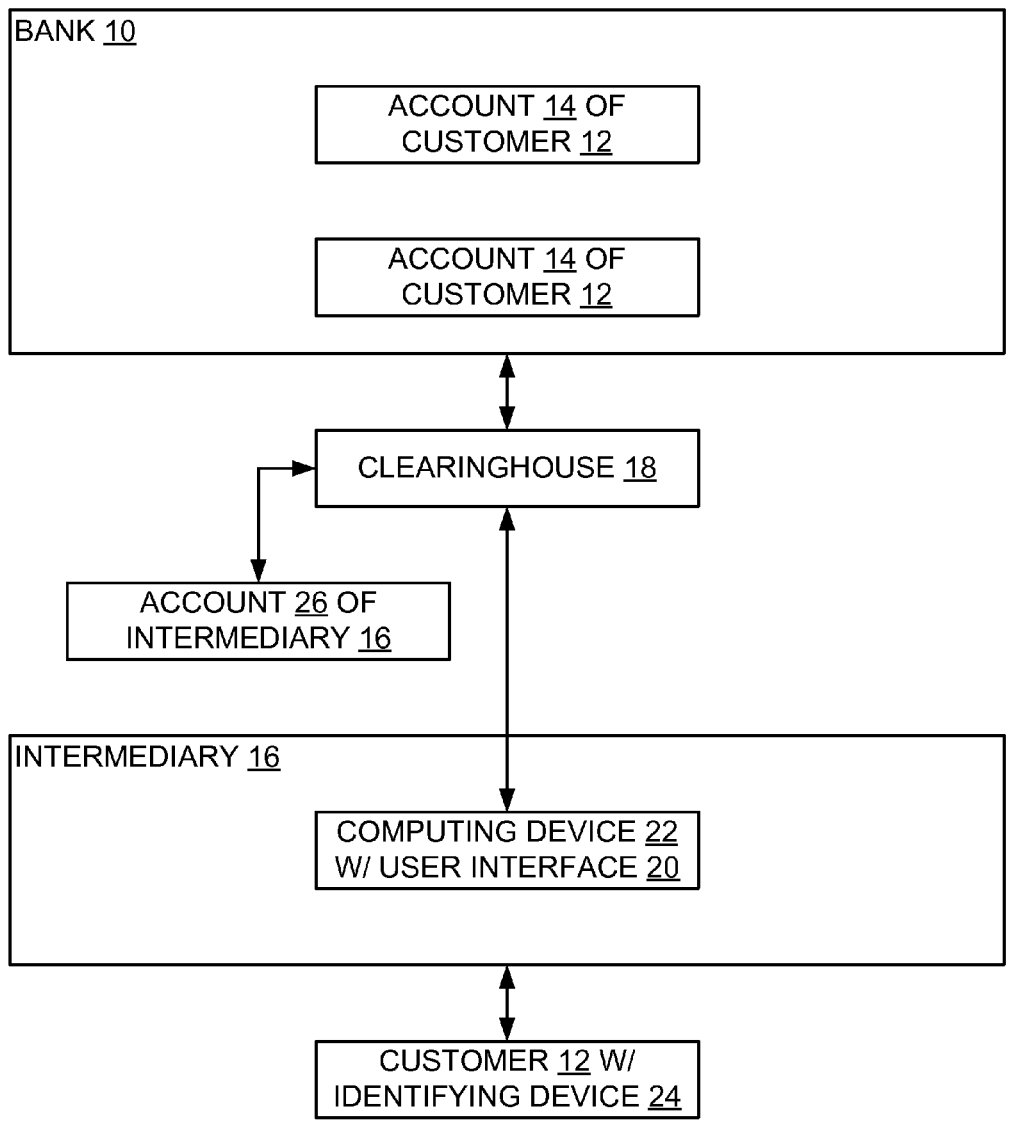
FIG. 2 is a block diagram of a system for performing flow-through banking in accordance with various embodiments of the present innovation.

In various embodiments of the present innovation, and turning now to FIG. 2, it is seen that a bank or other financial institution (hereinafter, 'bank 10') has a customer 12 that maintains one or more deposit accounts 14 with such bank for the purpose of performing financial transactions including deposits, withdrawals, and the like. As should be appreciated, the bank 10 may be most any bank or other financial institution, such as for example a large bank with many local branches, a small bank with only one or a few branches, a financial brokerage without banking branches per se, a credit union with a single branch, etc. Moreover, the accounts 14 may be most any accounts, including checking accounts, savings accounts, certificate of deposit accounts, lines of credit, loan accounts, and the like. Thus, and as was set forth above, the customer 12 may from time to time perform transactions with regard to the accounts 14 of such customer 12 at such bank, most notably including depositing and/or withdrawing funds from such accounts 14.

As was alluded to above, the customer 12 may at times perform such transactions without the need to visit a local branch of the bank, (i.e. 'in person'). For example, and again, the customer 12 may remotely perform many transactions with the bank 10 by way of a telephone connection or computing connection with the bank in a generally automated manner, or by visiting an automated teller machine (ATM). Nevertheless, the customer 12 may at times desire to perform transactions with the bank 10 in person, or may be required to perform such transactions with the bank 10 in person, or may be incapable of not performing transactions with the bank 10 in person, or the like.

If the customer 12 is physically located near a local branch of the bank 10, the customer 12 may visit same with relative ease to perform a transaction. However, and again, if not near such a local branch, traveling thereto may be more difficult, and increasingly so as the distance grows larger. Moreover, if the bank 10 wishes to attract and/or retain the customer 12 or a similar individual, the bank 10 is severely limited in being able to do so when the [remote] customer 12 is physically located a relatively large distance from the closest local branch of such bank 10.

The bank 10 may decide to build or otherwise acquire a local branch that is nearer to such a remote customer 12. However, it should be apparent that the cost to the bank 10 to do so is prohibitive, especially for a single remote customer 12, and even for only a few remote customers 12 in a particular area.

Instead, and in various embodiments of the present innovation, the bank 12 can arrange to employ a local branch or office of another entity acting as an intermediary 16 that performs flow-through banking transaction on behalf of the bank 10, such that the another intermediary 16 would perform transactions for a remote customer 12 or any other customer 12 of the bank 10, and the performed transactions would flow-through from the another intermediary 16 to the bank 10.

The intermediary 16 may of course be another bank that is not the bank 10, especially inasmuch as another bank as the entity would likely already be equipped with and/or capable of performing all necessary functionality so as to perform transactions for customers 12 of the bank 10 that would flow-through to the bank 10. Additionally, and in various embodiments of the present innovation, the intermediary 16 may be a non-bank, especially if provided with the requisite equipment and capabilities needed to perform transactions for customers 12 of the bank 10 that would flow-through to the bank 10. For example, the non-bank entity could be a merchant dedicated to performing flow-through transactions for the bank, or could be a department in a merchant having several different functions, such as at a supermarket, a department store, a supercenter, or any other appropriate entity.

Presumably, the intermediary 16 would perform flow-through transactions for a customer 12 of the bank 10 in return for some form of compensation such as a service fee or the like. While it is reasonable to consider that the compensation would be monetary in form, such as a payment either from the bank 10 or the customer 12, it could also be the case that the compensation would be non-monetary in form, such as for example the ability to increase traffic at the intermediary 16 or the ability to market goods and/or services of the intermediary 16 to customers 12 of the bank 10. If the compensation is in fact monetary, it is to be appreciated that the compensation could be based on each flow-through transaction performed by the intermediary 16 for a customer 12 of the bank 10, could be based on a fixed fee per period (i.e., month, year, etc.), or could be based on a more complex formula, among other things.

While the compensation for the intermediary 16 could be obtained directly from each customer 12 of the bank 10, it is likely the case that the bank 10 pays such compensation to the entity itself, as a cost of doing business. For one thing, the customer 12 if made to pay the compensation directly would view the payment as a disincentive to patronizing the bank 10, especially if other banks 10 are available to the customer 12 locally. For another, the bank 10 is likely in a better position than the customer 12 to negotiate such compensation with the intermediary 16. At any rate, the cost of the compensation to the bank 10 is likely far less than the cost to the bank 10 to open a local branch near the intermediary 16, and for that reason alone the cost of the compensation should be borne by the bank 10 willingly if not eagerly.

In various embodiments of the present innovation, the bank 10 would negotiate special or preferred relationships with at least some merchants to act as intermediaries 16 for the bank 10. Presumably, such special or preferred intermediaries 16 would be intermediaries 16 deemed especially beneficial to the bank 10. For example, the special or preferred intermediaries 16 may be compensated by the bank 10 at rates especially attractive to the bank 10, or may have local branches in locations especially desired by the bank 10, or could be deemed to be not a competitive threat to the bank 10, among other things.

For reasons that should be apparent, the bank 10 likely does not wish to give the intermediary 16 direct access to the accounts 14 of the customer 12. Fortunately, such direct access is not believed to be needed. In particular, and in various embodiments of the present innovation, the intermediary 16 performs transactions for the customers 12 of the bank 10 by way of available indirect debiting and crediting protocols that are known or should be apparent to the relevant public and therefore need not be set forth herein in any detail. For example, the indirect debiting and crediting protocols may be ACH (Automated Clearing House) debiting and crediting protocols that are available to most merchants and banks 10 from NACHA—The Electronic Payments Association, formerly the National Automated Clearing House Association, of Herndon, Va.

As should be understood, in such ACH protocols or in other similar protocols, a customer 12 of the bank 10 identifies to the intermediary 16 a particular account 14 thereof at the bank 10 by way of an account number for the account 14 and a routing number for the bank 10. For example, the customer 12 may present to the intermediary 16 a pre-printed deposit or withdrawal slip from the bank 10 with such account and routing numbers. With such information, then, the intermediary 16 can access such account 14 at such bank 10 on behalf of the customer 12 to perform the transaction, where such access is indirect by way of a clearinghouse 18 or the like that is trusted by both the bank 10 and the intermediary 16 to accurately and faithfully perform transactions.

Typically, in an ACH transaction or similar transaction, the clearinghouse 18 guarantees the transaction in real-time or near-real time, particularly to the party that is to receive funds based on the transaction, and presumably upon satisfying itself that the party that is to supply the funds in fact has such funds. However, the actual transfer of funds may take place later, perhaps as part of a batch of transactions that are processed through the clearinghouse 18.

Figure 3:
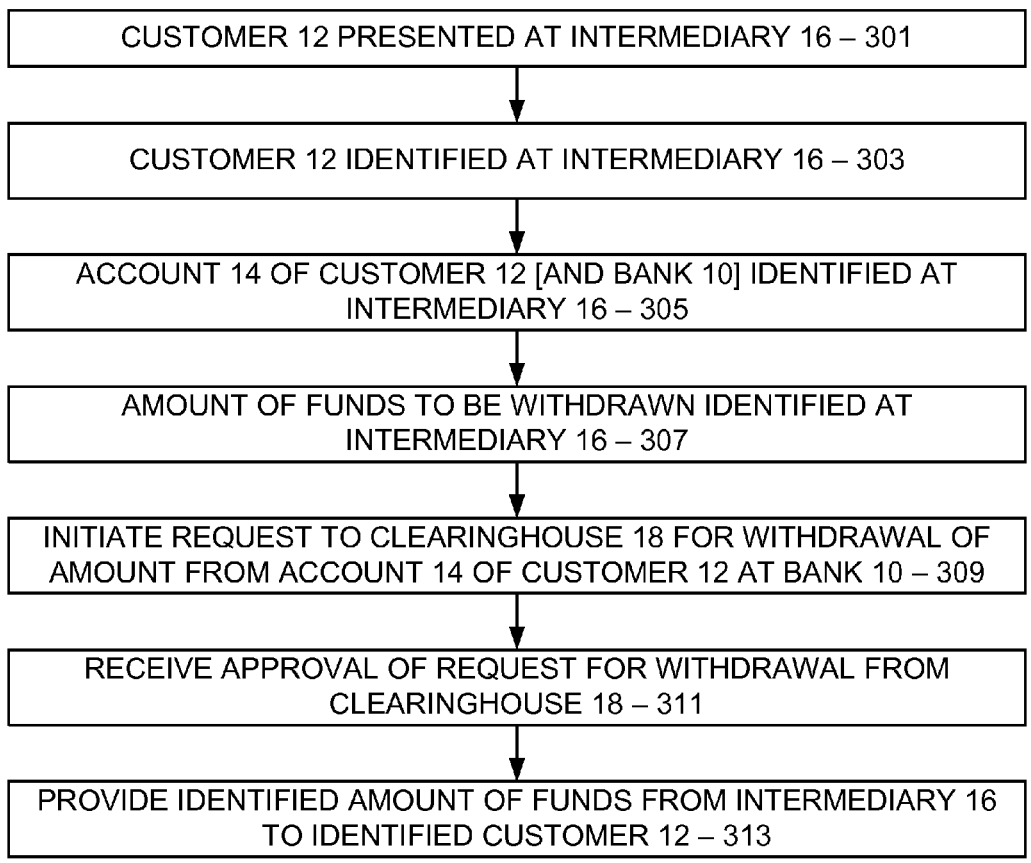
FIG. 3 is a flow diagram showing key actions performed in connection with the flow-through system of FIG. 2 in the course of withdrawing funds in accordance with various embodiments of the present innovation.

Turning now to FIG. 3, it is seen that a customer 12 having an account 14 at a bank 10 withdraws funds from such account 14 by way of an intermediary 16. Preliminarily, it is presumed that the customer 12 has presented himself or herself in person to a clerk, teller, customer service representative, associate or other agent (hereinafter, 'clerk') of the intermediary 16 (301). It is expected that the customer 12 identifies himself or herself to the clerk of the intermediary 16, at least insofar as such identification is required by the protocols of the clearinghouse 18 (303). As may be expected, such identification would typically be accomplished by showing the clerk a photo identification or the like from a governmental source, such as a driver's license, although the bank 10 may itself issue such photo identification to the customer 12.

Additionally, the customer 12 identifies the account 14 from which the funds are to withdrawn, and perhaps also the bank 10 having the account 14 if need be (305). Such an identification may be direct, by way of supplying the aforementioned account number and routing number, or may be indirect, by way of supplying a token representative of the aforementioned account number and routing number. Such token as may be appreciated may be a withdrawal slip with the identification encoded thereon, a magnetic strip card with the identification encoded thereon, a smart card with the identification stored in a memory thereon, an RFID tag or the like with the identification included therein, or any other reliable form that both provides the identification and also some level of assurance that the provided identification is legitimate and rightful. Note here that in the aforementioned case where the bank 10 issues a photo identification to the customer 12, such photo identification may incorporate the aforementioned magnetic strip card, smart card, RFID tag, or the like.

In at least some circumstances, the customer 12 in the course of identifying the account 14 may be required to provide a personal identification value or number, a secret code, a nonce, or some other form of information that only the customer 12 would know. As should be understood, such information that only the customer 12 would know shows that the customer 12 in fact has rights to withdraw funds from the identified account 14. As should be also understood, such information may be omitted in situations where it can be established that the customer 12 has rights to withdraw funds from the identified account 14 based on other indicia, or where the clearinghouse 18 does not require such information, among other things.

The customer 12 also identifies an amount of funds to be withdrawn from the identified account 14 (307). Note that such amount may be any appropriate amount, although limitations on such amount may be set by the bank 10, the intermediary 16, and/or the clearinghouse 18. Of course, if multiple parties set limitations on the amount withdrawn, the most restrictive limitation would be applied. Note too that the limitations on the amount may vary depending on the form in which the funds are received. For example, it may be that cash funds are limited to a few hundred dollars, while funds received as a certified check are limited to a few thousand dollars and funds received as a bank check are not limited except by the amount of funds in the identified account.

Once the customer 12, account 14, bank 10, an amount of funds to be withdrawn have been satisfactorily identified to the clerk of the intermediary 16, such clerk may then initiate a request for withdrawal in the identified amount from the identified account 14 of the identified customer 12 at the identified bank 10 by way of the clearinghouse 18 (309). Note here that such withdrawal is performed according to the established protocols of the clearinghouse 18, and thus may require that the clerk at the intermediary 16 enter the withdrawal by way of a particular device, a particular request screen, a particular access method, a particular user interface, or the like as specified by the clearinghouse 18. Of course, such a particular device, request screen, access method, user interface, or the like is generally known or should be apparent, may be any appropriate interfacing mechanism as specified by the clearinghouse 18, and thus need not be set forth herein in any detail other than that which is provided.

That said, in various envisioned scenarios, the particular device is a user interface 20 programmed into a computing device 22 at the intermediary 16, where the computing device 22 is a transaction register typically employed at the intermediary 16. For example, if the intermediary 16 is a retailer that has check-out registers, then the user interface 20 may be built into such check-out registers. Similarly, if the intermediary 16 is another bank that typically employs general ledger accounting terminals, then the user interface 20 may likewise be built into such terminals. Notably, if the account 14 is identified by the customer 12 by way of an identifying device 24 such as a magnetic strip card, smart card, RFID tag, or the like with identifying information, such identifying device 24 can be appropriately interfaced to the register or terminal or other computing device 22 to deliver such identifying information thereto.

Upon the clearinghouse 18 receiving the request for withdrawal from the clerk at the intermediary 16, the clearinghouse 18 performs whatever operations are necessary to establish in a satisfactory manner (1) that the identified customer 12 is entitled to withdraw the identified amount of funds from the identified account 14 at the identified bank 10, perhaps based on the customer 12 having presented a particular device 24 and/or a secret code, a personal identification number, a nonce, or the like; (2) that the identified account 14 at the identified bank 10 indeed contains at least the identified amount of funds, perhaps by querying the bank 10 for such information and then having the bank 10 place a hold on such amount; and (3) that the bank 10 will allow the withdrawal of the identified amount, among other things, perhaps by querying the bank 10 for whether the withdrawal is permitted according to a policy of the bank 10.

Generally, the clearinghouse 18 if satisfied approves the withdrawal, and in doing so guarantees that the identified amount of funds will be debited from the identified account 14 and credited to an account 26 of the intermediary 16, at least at some set point in the near future. As should be understood, the operations performed at the clearinghouse 18 are generally known or should be apparent to the relevant public and therefore need not be set forth herein in any detail other than that which is provided. Accordingly, the clearinghouse 18 may perform any appropriate operations without departing from the spirit and scope of the present innovation.

Presuming the request for withdrawal is approved by the clearinghouse 18, such approval is communicated to the requesting clerk at the intermediary 16 and upon receiving such approval (311), the clerk at the intermediary 16 provides the identified amount of funds to the identified customer 12 in an appropriate form as requested by the customer 12 and as available from the intermediary 16 (313). In this regard, it may be that the customer 12 wishes to receive the funds in cash and the intermediary 16 is amenable as long as the amount of cash is below a predetermined limit, over which the funds are in the form of a certified check. Alternately, it may be that the customer 12 wishes to receive all of the funds as an official check made out to a third party, or as a credit to a bill of the customer 12, perhaps with the intermediary 16 or with a third party, or as a deposit to another account 14 of the customer 12 at the identified bank 10 or at another bank 10, among other things.

Note here that the provided funds as at 313 or the identified amount of funds as at 307 may be adjusted slightly if the customer 12 is to pay a service fee or the like to the intermediary 16 such as that which was set forth above, where the adjustment is to cover the service fee. Such adjustment is generally known and therefore may be performed in any appropriate manner.

Note too that from an accounting point of view, the transaction of FIG. 3 includes a debit of funds from the identified account 14 of the customer 12 and a corresponding credit to the account 26 of the intermediary 16, and a debit of funds from the intermediary 16 and a corresponding credit according to the directions of the customer 12. Presumably, and omitting any service fees or the like, the credit to the account 26 of the intermediary 16 should match the debit of funds from the intermediary 16 so as to render such credit and debit a wash, with the result being that the debit of funds from the identified account 14 of the customer 12 effectively flows through to the customer 12 by way of the credit thereto.

Figure 4:
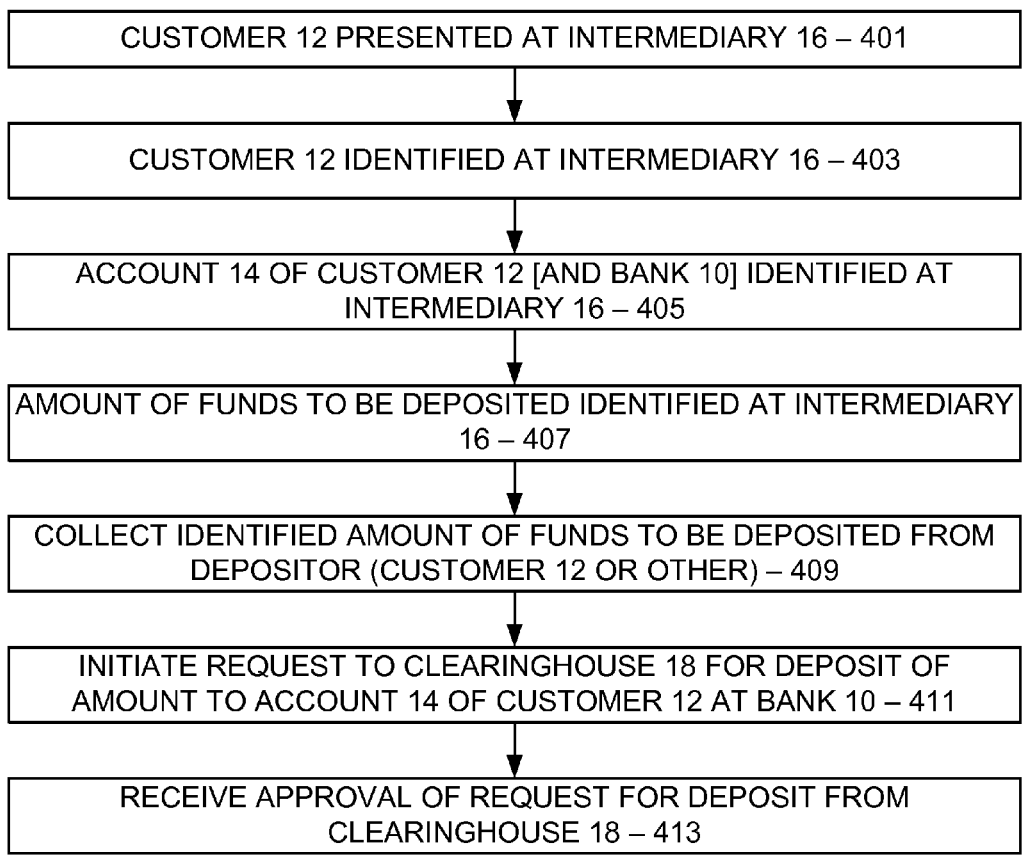
FIG. 4 is a flow diagram showing key actions performed in connection with the flow-through system of FIG. 2 in the course of depositing funds in accordance with various embodiments of the present innovation.

Turning now to FIG. 4, it is seen that a customer 12 having an account 14 at a bank 10 deposits funds into such account 14 by way of an intermediary 16 in a manner similar to that set forth in connection with FIG. 3. Here, and again, the customer 12 presents himself or herself in person to the clerk of the intermediary 16 (401), identifies himself or herself to the clerk of the intermediary 16, at least insofar as such identification is required by the protocols of the clearinghouse 18 (403), identifies the account 14 into which the funds are to be deposited, and perhaps also the bank 10 having the account 14 if need be (405), and identifies an amount of funds to be deposited into the identified account 14 (407). Note here that inasmuch as a deposit involves the bank 10 receiving funds and not paying out such funds as with a withdrawal, such bank 10 and/or the clearinghouse 18 may employ standards for identifying the customer 12 as at 403 that are more relaxed as compared to the standards employed with regard to a withdrawal. In fact, no identification of the customer 12 may be required, and in fact anyone may be permitted to deposit funds into the account 14 of the customer 12.

Once the customer 12, account 14, bank 10, an amount of funds to be withdrawn have been satisfactorily identified to the clerk of the intermediary 16, such clerk may then initiate a request to deposit the identified amount into the identified account 14 of the customer 12 at the identified bank 10 by way of the clearinghouse 18 (411). However, and significantly, before doing so the clerk at the intermediary 16 should ensure that the funds to be deposited are collected from the depositor, be it the customer 12 or another person (409).

Generally, the funds to be deposited may take the form of cash or a non-cash instrument such as a check. In the case of cash, the transaction is relatively straightforward inasmuch as the cash upon being collected represents funds that are immediately in the possession of the intermediary 16. However, in the case of a non-cash instrument such as a check, the transaction is not as straightforward inasmuch as the instrument upon being collected represents funds that are not in the possession of the intermediary 16 until the instrument is itself cleared by way of an appropriate clearinghouse. Thus, the intermediary 16 may decide to wait to deposit the funds into the account 14 of the customer 12 until the instrument clears. However, such clearing may take a few days of performed in a traditional manner, which as should be understood is not feasible.

Accordingly, in various embodiments, if funds to be deposited are embodied as an instrument, the intermediary 16 electronically presents the instrument for clearing by way of a clearinghouse which may be the clearinghouse 18 or another clearinghouse. As is known, such electronic presentment is performed by the intermediary 16 by way of information already present on the instrument and presumably results in an approval from the clearinghouse is a matter of seconds. Here, similar to before, the approval is a guarantee that the amount of funds represented by the instrument will be debited from a corresponding bank account and credited to an account 26 of the intermediary 16, at least at some set point in the near future.

Presuming that the funds to be deposited are collected as at 409, the deposit of the funds to the account 14 of the customer 12 as at 411 is performed according to the established protocols of the clearinghouse 18, and thus may require that the clerk at the intermediary 16 enter the deposit by way of a particular device, a particular request screen, a particular access method, a particular user interface, or the like as specified by the clearinghouse 18. Again, the particular device may be a user interface 20 programmed into the computing device 22 at the intermediary 16, and if the account 14 is identified by the customer 12 by way of a device 24 such as a magnetic strip card, smart card, RFID tag, or the like with identifying information, such identifying device 24 can be appropriately interfaced to the computing device 22 to deliver such identifying information thereto.

Upon the clearinghouse 18 receiving the request to deposit from the clerk at the intermediary 16, the clearinghouse 18 performs whatever operations are necessary to establish in a satisfactory manner that an account 26 of the intermediary 16 contains sufficient funds to effectuate the deposit, among other things. As before, the clearinghouse 18 if satisfied approves the deposit, and in doing so guarantees that the identified amount of funds will be debited from the account 26 of the intermediary 16 and credited to the identified account 14 of the customer 12, at least at some set point in the near future. As should be understood, the operations performed at the clearinghouse 18 are generally known or should be apparent to the relevant public and therefore need not be set forth herein in any detail other than that which is provided. Accordingly, the clearinghouse 18 may perform any appropriate operations without departing from the spirit and scope of the present innovation.

Presuming the request to deposit is approved by the clearinghouse 18, such approval is communicated to the requesting clerk at the intermediary 16 and upon receiving such approval (413), the clerk at the intermediary 16 may provide a receipt or other confirmation to the customer 12 or other person for the transaction so as to memorialize the transaction. As before, the deposited funds may be adjusted slightly if the customer 12 or another person is to pay a service fee or the like to the intermediary 16 such as that which was set forth above, where the adjustment is to cover the service fee.

From an accounting point of view, the transaction of FIG. 4 includes a credit of funds to the identified account 14 of the customer 12 and a corresponding debit to the account 26 of the intermediary 16, and a credit of funds to the intermediary 16, either from cash or a non-cash instrument and a corresponding debit to the customer 12. Presumably, and omitting any service fees or the like, the debit to the account 26 of the intermediary 16 should match the credit of funds to the intermediary 16 so as to render such debit and credit a wash, with the result being that the credit of funds to the identified account 14 of the customer 12 effectively flows through to the customer 12 by way of the debit thereto.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are provided by which a customer 12 of a bank 10 may perform an flow-through transaction with such bank 10 without the need to travel to a local branch of the bank 10 to perform a transaction equivalent to such flow-through transaction. Instead, the customer 12 travels to an intermediary 16 that acts as an agent for the bank 10 and performs a deposit or withdrawal into an account 14 of the customer 12 at the bank 10 by way of an electronic clearinghouse 18. Thus, the bank 10 need not have a local branch established for the customer 12. It should be appreciated that changes could be made to the embodiments described above without departing from the innovative concepts thereof. For example, although the present innovation is set forth primarily in terms of performing deposits and withdrawals, other transactions may also be performed at the intermediary 16 and flow through to an account 14 of the client 12 at the bank 10. Likewise, although the present innovation is set forth primarily in terms of a clerk at the intermediary 16 performing certain functionality, such clerk may instead be replaced by an automated kiosk or the like in at least some circumstances. It should be understood, therefore, that this innovation is not limited to the particular embodiments disclosed, but it is intended to cover modifications within the spirit and scope of the present innovation as defined by the appended claims.

The invention claimed is:

1. A computer implemented method performed with regard to a customer having a deposit account at a financial institution, the method for performing a flow-through transaction for the customer with regard to the account as an intermediary between the customer and financial institution, and comprising:
   - receiving the customer at a site of the intermediary;
   - determining from the received customer that the flow-through transaction is to be a withdrawal of funds from the account;
   - receiving from the customer an identification thereof, an identification of the financial institution, an identification of the account of the customer at the financial institution, and an identification of an amount of funds to be withdrawn from the account;
   - initiating, via a computing device, a request to a clearinghouse for the withdrawal in the identified amount from the identified account of the identified customer at the identified financial institution, the clearinghouse upon receiving the request from the intermediary establishing that the request is satisfactory and returning approval of same to guarantee that the identified amount of funds is to be debited by the clearinghouse from the identified account at the identified financial institution and credited by the clearinghouse to an account of the intermediary; and
   - providing the identified amount of funds to the customer upon receiving the approval from the clearinghouse, the provided funds being in a form requested by the customer and available from the intermediary,
   - wherein the customer need not visit a site of the financial institution to perform thereat a transaction equivalent to the flow-through transaction.

2. The method of claim 1 wherein the intermediary is an entity other than the financial institution, the entity being one of another financial institution, and having a department used to perform flow-through transactions for customers of the financial institution.

3. The method of claim 1 wherein the intermediary receives compensation for performing the flow-through transaction, the compensation being paid by the financial institution.

4. The method of claim 1 wherein the clearinghouse is an ACH clearinghouse effectuating ACH debiting and crediting protocols.

5. The method of claim 1 wherein the identification of the customer is issued thereto by the financial institution.

6. The method of claim 1 wherein the identification of the account is an account number and the identification of the financial institution is a routing number.

7. The method of claim 1 wherein the identification of the account is received by way of a token representative of the account as issued by the financial institution to the identified customer, the identification including an account number of the account and a routing number of the financial institution, the token being one of a withdrawal slip with the identification encoded thereon, a magnetic strip card with the identification encoded thereon, a smart card with the identification stored in a memory thereon, and an RFID tag with the identification included therein.

8. A non transitory computer-readable storage medium having computer-executable instructions thereon that, when executed by a computer, cause the computer to perform a process implementing a method performed with regard to a customer having a deposit account at a financial institution, the method for performing a flow-through transaction for the customer with regard to the account as an intermediary between the customer and financial institution, and comprising:
  receiving the customer at a site of the intermediary;
  determining from the received customer that the flow-through transaction is to be a withdrawal of funds from the account;
  receiving from the customer an identification thereof, an identification of the financial institution, an identification of the account of the customer at the financial institution, and an identification of an amount of funds to be withdrawn from the account;
  initiating, via a computing device, a request to a clearinghouse for the withdrawal in the identified amount from the identified account of the identified customer at the identified financial institution, the clearinghouse upon receiving the request from the intermediary establishing that the request is satisfactory and returning approval of same to guarantee that the identified amount of funds is to be debited by the clearinghouse from the identified account at the identified financial institution and credited by the clearinghouse to an account of the intermediary; and
  providing the identified amount of funds to the customer upon receiving the approval from the clearinghouse, the provided funds being in a form requested by the customer and available from the intermediary,
  wherein the customer need not visit a site of the financial institution to perform thereat a transaction equivalent to the flow-through transaction.

9. The medium of claim 8 wherein the intermediary is an entity other than the financial institution, the entity being one of another financial institution, and having a department used to perform flow-through transactions for customers of the financial institution.

10. The medium of claim 8 wherein the intermediary receives compensation for performing the flow-through transaction, the compensation being paid by the financial institution.

11. The medium of claim 8 wherein the clearinghouse is an ACH clearinghouse effectuating ACH debiting and crediting protocols.

12. The medium of claim 8 wherein the identification of the customer is issued thereto by the financial institution.

13. The medium of claim 8 wherein the identification of the account is an account number and the identification of the financial institution is a routing number.

14. The medium of claim 8 wherein the identification of the account is received by way of a token representative of the account as issued by the financial institution to the identified customer, the identification including an account number of the account and a routing number of the financial institution, the token being one of a withdrawal slip with the identification encoded thereon, a magnetic strip card with the identification encoded thereon, a smart card with the identification stored in a memory thereon, and an RFID tag with the identification included therein.

15. A system operated with regard to a customer having a deposit account at a financial institution, the system performing a flow-through transaction for the customer with regard to the account for an intermediary between the customer and financial institution, and comprising, upon receiving the customer at a site of the intermediary and determining from the received customer that the flow-through transaction is to be a withdrawal of funds from the account:
  a subsystem that receives from the customer an identification thereof, an identification of the financial institution, an identification of the account of the customer at the financial institution, and an identification of an amount of funds to be withdrawn from the account;
  a subsystem that initiates a request to a clearinghouse for the withdrawal in the identified amount from the identified account of the identified customer at the identified financial institution, the clearinghouse upon receiving the request from the intermediary establishing that the request is satisfactory and returning approval of same to guarantee that the identified amount of funds is to be debited by the clearinghouse from the identified account at the identified financial institution and credited by the clearinghouse to an account of the intermediary; and
  a subsystem that provides the identified amount of funds to the customer upon receiving the approval from the clearinghouse, the provided funds being in a form requested by the customer and available from the intermediary,
  wherein the customer need not visit a site of the financial institution to perform thereat a transaction equivalent to the flow-through transaction.

16. The system of claim 15 wherein the intermediary is an entity other than the financial institution, the entity being one of another financial institution, and having a department used to perform flow-through transactions for customers of the financial institution.

17. The system of claim 15 wherein the intermediary receives compensation for performing the flow-through transaction, the compensation being paid by the financial institution.

18. The system of claim 15 wherein the clearinghouse is an ACH clearinghouse effectuating ACH debiting and crediting protocols.

19. The system of claim 15 wherein the identification of the customer is issued thereto by the financial institution.

20. The system of claim 15 wherein the identification of the account is an account number and the identification of the financial institution is a routing number.

21. The system of claim 15 wherein the identification of the account is received by way of a token representative of the account as issued by the financial institution to the identified customer, the identification including an account number of the account and a routing number of the financial institution, the token being one of a withdrawal slip with the identification encoded thereon, a magnetic strip card with the identification encoded thereon, a smart card with the identification stored in a memory thereon, and an RFID tag with the identification included therein.

* * * * *